United States Patent [19]

Varner

[11] Patent Number: 4,488,779
[45] Date of Patent: Dec. 18, 1984

[54] LIGHTWEIGHT HELIOSTAT SYSTEM

[76] Inventor: Kevin Varner, Rte. 2, Ogilvie, Minn. 56358

[21] Appl. No.: 443,028

[22] Filed: Nov. 19, 1982

[51] Int. Cl.³ .................................................. G02B 7/18
[52] U.S. Cl. ..................................... 350/632; 350/637
[58] Field of Search ............... 350/292, 299, 295, 310, 350/288; 324/97; 353/3

[56] References Cited

U.S. PATENT DOCUMENTS

| 1,966,112 | 7/1934 | Blau | 324/97 |
| 2,126,252 | 8/1938 | Gerlach | 324/97 |
| 2,335,072 | 11/1943 | Marsh | 324/97 |
| 4,209,231 | 6/1980 | Sayre | 350/292 |

Primary Examiner—Jon W. Henry
Attorney, Agent, or Firm—Williamson, Bains, Moore & Hansen

[57] ABSTRACT

A lightweight heliostat system utilizing a flexible, tensioned wire framework is supported on upright rigid posts and has rigid mirrors swingably mounted in the wire framework to pivot about first and second axes and utilizes the mirrors as compressive struts to aid in tensioning of the wire framework. The system is suitable for mounting of a plurality of such mirrors in parallel rows and columns to define large arrays of reflective mirrors.

10 Claims, 8 Drawing Figures

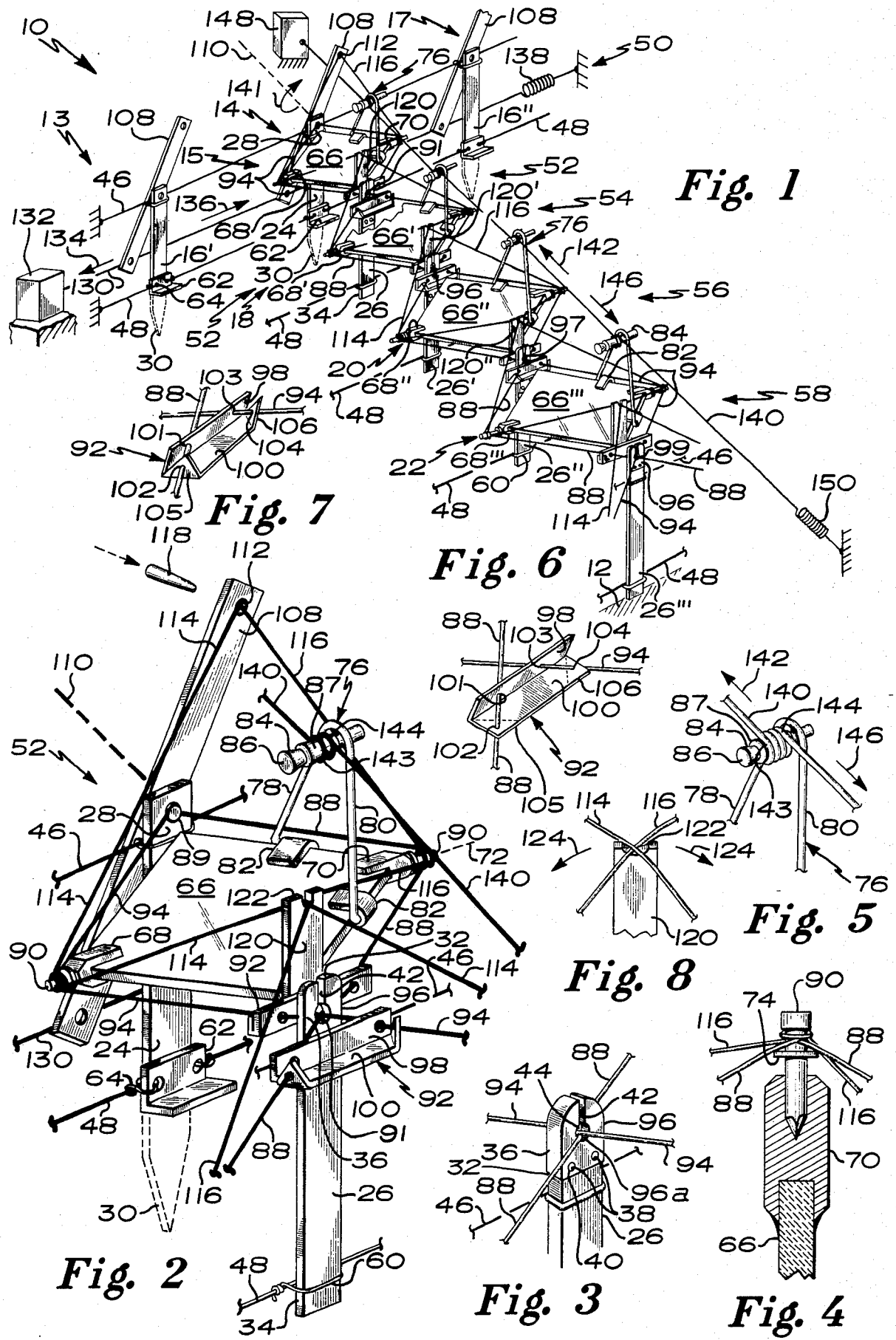

LIGHTWEIGHT HELIOSTAT SYSTEM

BACKGROUND OF THE INVENTION

The invention relates to the field of solar energy collection and comprises an improved heliostat construction utilizing rigid mirrors as compressive struts in a flexible tensioned wire framework.

In recent years solar energy has been recognized as a prime and virtually infinite source of inexpensive energy but improved collection systems are urgently needed in order to gather the sun's energy at a cost reasonably competitive with other fuels. For large scale collection of solar energy, arrays of heliostats have been found desirable.

Heliostats utilize a sun reflecting mirror which is carried by a mechanical framework and generally include control systems to track the sun and cause the solar energy to be reflected to a target where the light energy is utilized or converted to other forms of energy. Present heliostats utilize pedestal mountings which are expensive and require heavy steel or concrete frameworks for support of the mirror. Typically, the larger the mirror surface, the greater the amount of steel and concrete needed to effectively anchor and stabilize the structure against the wind forces to which larger mirrors are subjected. Recent studies have determined that for each square foot of mirror surface used in a heliostat, approximately eight pounds of steel framework are needed for its support. A large heliostat utilizing a 300 square foot mirror can require a ten ton foundation. With these problems in mind, it is crucial to develop heliostats which do not require such expensive and massive support systems.

In order for solar energy to become a practical source of new energy, it is desirable to develop an inexpensive heliostat which is practical, long lasting and easy to build and maintain. Efforts have been directed to reducing the weight of the heliostat, as in U.S. Pat. Nos. 3,843,238, 4,251,135 and 4,134,387 by eliminating the traditional rigid mirror and replacing it with a thin, reflective synthetic film which is stretched by a lightweight frame. While such a mirror structure reduces heliostat weight and permits lighter structural support components, it is more vulnerable to weather damage and deterioration, and its tendency toward optical distortion and deformation by wind loads has questioned its long term utility.

To meet long term United States energy requirements for electrical power, studies have suggested solar energy farms occupying the deserts of the western United States. Current United States heat energy requirements for electrical energy generation are on the order of 78 quadrillion BTU. Since under ideal conditions approximately 300 BTU per square foot per hour can be obtained from sunlight, assuming a conversion rate of 10 to 20 percent efficiency, then tens of thousands of square miles of heliostat structures would be required to meet United States requirements.

If energy independence is to be realized by utilization of solar energy, the challenge of building such a massive system of heliostats at a rate of construction which exceeds the rate of deterioration will require a long lasting, simple, inexpensive and rapidly erected heliostat structure. The present invention is directed toward meeting this need.

SUMMARY OF THE INVENTION

The invention comprises a new, lightweight system of supporting rigid mirrors using a framework of flexible tensioned wire which requires a minimum of material and construction time.

The lightweight heliostat system embodying the invention replaces the known heavier all-steel or all-concrete frames used for mirror support with a plurality of upright posts from which a framework of flexible tensioned wire is supported. Mirrors are arranged in horizontal rows and columns with adjacent mirrors being separated by an upright post. A pair of primary support wires extends along each row from post to post and about the periphery of each mirror, utilizing the mirrors as compressive struts to aid in tensioning and supporting the flexible wire framework.

A pair of secondary support wires is associated with each of the rows of mirrors and overlies the mirrors, extending along each row and being retained at attachment points adjacent each post. The secondary support wires engage and retain the mirrors in predetermined orientations and provide a means for transmitting control forces to each mirror so as to rotate the mirror about a first axis in controlled increments.

Control wires extend both parallel to and also at right angles to the rows of mirrors and aid in swinging the mirrors about first and second axes during solar tracking. An arm is positioned at the end of each row, extends upwardly above the mirrors and anchors one extremity of the secondary support wires which extend to mirrors in the row. Each mirror is provided with a bail which extends upwardly from the mirror surface and engages a control wire so that the mirrors may be swung about a second axis. All control wires are connected to transducers which move the wires in controlled increments to permit tracking of the sun or other radiant energy source by the individual heliostat mirrors.

The spacing between adjacent rows of mirrors is closely maintained by upper and lower spacing wires which are attached to the posts adjacent the top and bottom of each post and which also help keep the posts upright.

The lightweight heliostat support system disclosed herein provides reliable, long-lasting support for the rigid mirrors while utilizing a substantially reduced quantity of material, thereby diminishing installation cost of the system. It is anticipated that improved economy of construction and long use life will permit large fields of such heliostats to be erected and maintained so as to provide an efficient energy collection system at a manageable cost. It is further anticipated that the simplicity and economy realized by the system will permit arrays of mirrors to be erected faster than presently known systems and thus permit substantial early expansion of solar collection facilities.

These and other objects and advantages of the invention will appear more fully from the following description made in conjunction with the accompanying drawings wherein like reference characters refer to the same or similar parts throughout the several views.

BRIEF DESCRIPTION OF THE DRAWINGS

FIG. 1 is a perspective view of a heliostat system embodying the invention.

FIG. 2 is a perspective view of one of the heliostats of FIG. 1.

FIG. 3 is a perspective view of the upper end of a post used in supporting the heliostats of FIG. 1.

FIG. 4 is a cross sectional side view of a mirror pivot used in swinging the mirrors of the heliostats.

FIG. 5 is a perspective view of the bail carried by each mirror and used in pivoting the mirror.

FIG. 6 is a perspective view of a clamp useful to retain the supporting wires of the heliostat in predetermined orientations and in which the clamp tabs are unbent.

FIG. 7 is a view of the clamp of FIG. 6 showing the tabs of the clamp in bent clamping position.

FIG. 8 is a perspective view of an upright spacer used with the heliostats of FIG. 1.

DESCRIPTION OF THE PREFERRED EMBODIMENT

Referring now to FIGS. 1 and 2, a lightweight heliostat system 10 which embodies the invention is shown mounted on a substantially level mounting surface 12 and may utilize any reasonable member of individual heliostats ranging from a single heliostat 15 to a large array of 100 or more such units. As will be explained further hereafter, it is preferred that the heliostat system contain a plurality of individual heliostats arranged in rows such as row 14 and columns such as 52 of FIG. 1 and that the rows have equal numbers of heliostats therealong with the number of rows being adapted to the energy collection requirements and the available space.

The individual heliostats 15, 18, 20 and 22 are substantially identical, and accordingly only heliostat 15 will be described in full detail. The heliostat 15 utilizes first and second substantially upright, rigid members 24 and 26, respectively, which may be formed of any suitable material although wood or an appropriate synthetic substitute such as fiberglass is preferred. The first member 24 comprises a post having upper and lower ends 28 and 30, respectively, with the lower end 30 being driven into the mounting surface 12 to provide a firm, long lasting mounting arrangement.

The second member 26 is also provided with upper and lower ends 32 and 34, respectively, with the lower end 34 resting on the surface 12, rather than being driven into the surface. While it is preferred to have the lower end 34 resting upon the surface 12, it should be understood that in specific installations where greater rigidity and strength are needed, the post 26 could be driven into the mounting surface 12.

As best shown in FIG. 3, the upper end 32 of post 26 includes a cap 36 which is preferably formed of brass, aluminum or other suitable material having a hardness less than that of the tensioned wires 88 and 94 comprising the framework described hereafter. The cap 36 has a pair of mounting apertures 38 which communicate with bores passing through the post 26 and into which a pair of rivets 40 or screws, bolts or other suitable fastener is inserted so as to retain the cap to the post.

The top of the cap 36 has a vertical slot 42 which communicates with a bore 44 so as to allow the wires to be slipped down the slot and to thereafter be retained in bore 44.

The upright posts 24 and 26 and the remaining posts 26', 26" and 26'" are spaced equally from one another along the row 14 as is post 26 from post 24, providing substantially equal spacing between the individual mirrors as described further hereafter.

Upper and lower generally parallel spacing wires 46 and 48, respectively, extend transversely to the row 14 and are fixed to the upper and lower ends of each post 24, 26, 26', 26", etc. in row 14 and extend to the posts of adjacent rows of heliostats, although the upper wires 46 are not shown as being attached to posts 26, 26', 26" of FIG. 1 for purposes of drawing simplification. It should be understood that an upper and lower spacing wire 46 and 48 is attached to upper and lower ends of each of the posts 26, 26', 26" and 26'" of each row and extend transversely to each row. The spacing wires 46 and 48 not only assure equal separation between adjacent posts in columns 52 and in adjacent columns 54, 56, and 58, but further provide needed structural support to retain the posts in an upright orientation. Accordingly a separate pair of spacing wires 46 and 48 are associated with each post of row 14 and extend to a corresponding post on adjacent rows. For example, the spacing wires 46 and 48 which are fixed to post 24 of row 14 extend to post 16' of row 13 and to post 16" of row 17.

The upper and lower spacing wires may be attached to the posts 24 and 26 in any manner known to the art, but it is preferred that the wires be joined to the posts by wire segments 60 of FIG. 2 which pass about one side of the post 26 and then tightly encircle the wire 48 and clamp it to the post. An alternative preferred embodiment utilizes an angle iron strip 62 (FIG. 2) which bears against one side of a post 24 and has one or more wire segments 64 which pass through apertures in the angle iron and tightly encircle the post to engage the wire and clamp the wire 48 firmly against the post.

The upper and lower spacing wires 46 and 48 and the already described posts 24, 26, 26', 26", 26'", 16' and 16", along with the additional posts making up the array symbolically shown in FIG. 1, collectively comprise a rigid stabilizing network which is attached to the mounting surface and provides a reliable means for carrying the wire framework and plurality of mirrors which will be described hereafter.

Referring again to FIGS. 1 and 2, a plurality of identical, rigid, substantially planar mirrors, 66, 66', 66", 66'" are utilized in the heliostat system and are preferably of a geometrically regular configuration, the square or rhombus configuration of FIG. 2 being preferred.

Each of the shown mirrors is provided with a pair of identical weather resistant pivot units 68 and 70, best shown in FIG. 2, which are preferably formed of plastic or other long wearing material, and are permanently attached to the opposed edges of the mirror 66 in any known fashion, an appropriate adhesive being preferred. The axis 72 which passes through the centers of the pivot units 68 and 70 also passes through the center of gravity of the mirror to assure balanced movements of the mirror. Each of the pivot units is provided with a pin 90 and an annular flange 74 fixed to the pin as best shown in FIG. 4. Flange 74 provides a means by which the primary support wires 88 and 94 may be attached to and spaced outwardly from the mirror 66.

Each mirror 66 has an upwardly extending bail 76 whose legs 78 and 80 are retained to the edges of the mirror by clips 82. At the apex of the bail 76 is an outwardly extending rod 84 which is joined to the apex by soldering, welding, brazing or the like and preferably comprises a short length of metal rod or tubing whose outer end 86 may be flared or expanded to better retain a rotatable sleeve 87 thereon.

As best shown in FIGS. 1 and 2, a first primary support wire 88 is fixed to pivot bolt 89 on post 24 and extends to pivot unit 70 of mirror 66. The support wire 88 encircles the pin 90 of pivot unit 70 as best shown in FIG. 4 and is spaced outwardly from the mirror by annular flange 74.

The wire 88 continues along row 14, passing onwardly from the pin 90 and toward post 26, passing through the slotted aperture 42 in cap 36 after passing through a clamp 92 which will be described further hereafter. The continuous support wire 88 then continues from post cap 36 through a second clamp 92 to pivot unit 68' of the adjacent mirror 66', thereafter continuing in zigzag fashion between posts and pivot units until reaching the last post 26 to which its end is anchored by a pivot bolt 89 like that shown on post 24 of FIG. 1.

A second primary support wire 94 is fixed to the pivot bolt 89 at post 24 and extends along the row 14 of mirrors, passing first to pin 90 of pivot unit 68 and after encircling it as shown in FIG. 4, continuing onward through clamp 92 to cap 36 on post 26. The second primary support wire 94, like first primary support wire 88, is continuous, winding in zigzag fashion along the row 14 and finally terminating at the last post of row 14 where it is fixed to a pivot bolt 89 like that shown on post 24 of FIG. 1. Accordingly, the first and second support wires 88 and 94, respectively, cooperate to encompass each of the individual mirrors 66, 66', 66", 66"', etc. of the row 14 and cross at junctions 91, 96, 97 and 99.

It should be understood that the second primary support wire 94, like wire 88, encircles the pins 90 of the mirror pivot units 68 or 70 which it encounters on the mirrors of row 14. Both the first and second primary support wires 88 and 94 are tensioned and cooperate to closely surround the individual mirrors of row 14 to provide protection to the outer periphery of the mirrors. Each of the rigid mirrors 66, 66', 66", etc. used in the array 10 of FIG. 1 serves as a compressive strut which spaces the support wires 88 and 94 apart while simultaneously acting as a reflective mirror in the array.

On each side of the junctions of primary support wires 88 and 94, clamps 92 securely retain the wires 88 and 94 to maintain the wires in substantially stationary positions at the junctions and to thereby help keep the mirrors in a predetermined orientation. The clamps 92, all of which are substantially identical, are shown in FIGS. 6 and 7, and each clamp 92 comprises a rigid metallic strip having first and second intersecting rigid perpendicular surfaces 98 and 100. Apertures 101 and 102 in surfaces 98 and 100, respectively, are sized to closely receive and accommodate the first support wire 88, and identical apertures 103 and 104 accommodate the second support wire 94. Corner tabs 105 and 106, after insertion of wires 88 and 94 through apertures 102 and 104, are bent at an angle to surface 100 as shown in FIG. 7, thereby providing an effective, but inexpensive, clamping means for wires 88 and 94. The clamps 92 are particularly helpful in the event that a mirror is damaged or broken and assist in maintaining the tension in the wires 88 and 94 which support mirrors located adjacent a broken mirror. While clamps have been shown as a workable structure to pin together the wires at the junctions, it should be understood that other methods such as twisting the wires together, thermo compression bending, ultrasonic bonding or laser welding appear workable and are within the purview of the invention.

A rigid arm 108 is swingably mounted to post 24 for movement about a generally horizontal axis 110 passing through pivot bolt 89. Arm 108 has a bore 112 at the upper end from which first and second secondary support wires 114 and 116, respectively, originate. Preferably the arm 108 is mounted with axis 110 passing through the center of gravity of the arm to assure smooth balanced movement of the arm. The wires 114 and 116 are securely fixed to the arm 108 by any known means. The use of a rigid, tapered pin 118 force fitted into bore 112 to trap the wires 114 and 116 therein has been found acceptable.

The first secondary support wire 114 extends downwardly from its anchoring location at bore 112 to outwardly extending pin 90 at pivot unit 68 where it encircles the pin 90 and continues upwardly to upright, rigid spacer 120 which has its base resting on clamp 92 and has a bifurcated upper end 122. The continuous secondary support wire 114 extends downwardly from spacer 120 to the pin 90 of pivot unit 70 which is associated with the next mirror 66', the wire 114 encircling the pin 90 and then extending upwardly to upright spacer 120'. The wire 114 extends downwardly from spacer 120' to pivot unit 68" of mirror 66" and then extends to the next upright spacer 120" and continues in zigzag fashion until it reaches the last post in the row 14 where it is attached to a swingable arm identical to arm 108.

The second secondary support wire 116 extends downwardly from its anchoring point at bore 112 to mirror pivot unit 70 where it is securely wrapped about the outwardly extending pin 90 and then continues upwardly to the notch 122 of upright spacer 120 where it passes through the notch and is confined by the overlapping first secondary support wire 114. The continuous wire 116 extends downwardly from spacer 120 to pivot unit 68' and then continues its zigzag path to the next upright spacer 120', eventually terminating its zigzag path at the last post of row 14 where it is attached to a swingable arm identical to arm 108 of post 24.

Each of the upright spacers 120 has its base supported on surface 100 of a clamp 92 and is free to pivot on the surface 100 such that the upper end of the spacer may swing through an arc in directions 124 (FIG. 8) in response to swinging of the arm 108 about the axis 110.

It should be understood that the secondary support wires 114 and 116 are tensioned and aid in retaining all the mirrors of row 14 in a predetermined orientation relative to one another such that sunlight striking the mirrors of the row is reflected at a common target. Swinging of the arm 108 about axis 110 causes the mirrors 66, 66', etc. of row 14 to swing as a group about axis 110. During this swinging motion, the upright spacers 120, 120', 120", etc. swing through an arc in directions 124 as shown in FIG. 8 and help retain the secondary support wires in a tensioned condition. It should further be understood that the mirrors also serve a compressive strut function in keeping the secondary support wires 114 and 116 in a tensioned condition and accordingly permit the mirror to serve not only as a reflecting device but also as a cooperating element in the tensioning of the wire framework.

The primary support wires 88 and 94 and the secondary support wires 114 and 116 collectively comprise a tensioned wire framework formed of flexible wire and carried by the rigid posts in order to provide needed support for the plurality of mirrors making up the heliostat system. The term, "wire", as used herein is intended to refer to any reasonably flexible yet strong material which can be used to support and retain the mirrors of the shown heliostat system. Preferably, the wire framework is comprised of flexible steel wire and it has been found that 20 gauge wire is suitable for use as the primary support wires 88 and 94 when the mirrors are of an area of about one square foot per mirror and that 24 gauge wire can then be suitably employed as the secondary support wires 114 and 116. It has further been found that, with such size mirrors, an intermediate 22 gauge wire could be used for both primary and secondary support wires if it is desired to use wire of a single size. While steel wire is best employed in the wire framework of the invention, it is contemplated that synthetic wire substitutes such as glass fibers may be substituted when wires of non-conductive material are desired. In particular, where it is desirable to use the heliostat system in areas susceptible to lightning discharge, it is advisable to utilize wire of non-conductive, highly insulative material such as glass fibers, and such alternative wire materials are within the purview of the invention.

A first control wire 130 extends generally perpendicular to the row 14 and is attached to the lower end of each arm 108, being stretched rigidly between each of the arms and the arms 108 being mutually parallel. The wire 130 extends to a control transducer 132 which may be of any type known to the art which is suitable to pull the wire 130 in direction 134 or to permit the wire to move in opposite direction 136. The remaining end of control wire 130 is attached to a spring loaded reel shown symbolically at 138 or to an appropriate counterweight so as to generate a restoring force in direction 136 to move the wire 130 in direction 136. Accordingly, it should be understood that movement of control wire 130 in direction 134 causes the arms 108 to swing in direction 141 about the axis 110. Similarly, when the control unit 132 releases control wire 130, allowing it to move in direction 136, the arm 108 swings about axis 110 in a direction opposite to arrow 141. It is contemplated that a control system responsive to movement of the sun will be used to actuate transducer 132 as needed to keep the heliostat mirrors in the proper reflective orientation.

A second control wire 140 extends parallel to each row, such as row 14 of the heliostat system and is tautly extended between the outwardly extending pins 84 of the bails 76 of the mirrors. As best shown in FIG. 5, the control wire 140 encircles the pin 84 one or more times and then extends onwardly to similarly encircle the pins of the bails of the remaining mirrors of the row. As best shown in FIG. 5, when control wire 140 is pulled in direction 142, the wire unwinds from the pin 84 at loop 143 and simultaneously winds onto the pin at loop 144 while sleeve 87 rotates freely on pin 84. This configuration assures a smooth operating control action in which the control wire 140 reliably and predictably swings each of the bails simultaneously in the desired direction in response to movement of the control wire. Similarly, when the control wire moves in direction 146, it unwinds from loop 144 and winds onto the loop 143. While only one of the bails has been described in conjunction with control wire 140, it should be understood that all of the bails used in the array 10 are substantially identical.

One end of the second control wire 140 is attached to the lateral control unit 148. It should be understood that the control unit 148 may utilize any control system known to the art which would be suitable for moving the control wire 140 in direction 142, or incrementally releasing it for movement in direction 146 in response to movement of the sun. The remaining end of second control wire 140 is attached to a spring reel 150 or counterweight so as to provide a restoring force on wire 140 in direction 146 to pull the control wire 140 in direction 146 as the control unit 148 incrementally releases the second control wire. The reel or counterweight 150 is anchored to the earth or some other stationary object. Accordingly, movement of the control wire in directions 142 or 146 causes the bails 76 to be pulled with the wire and each of the mirrors in row 14 to be swung about the axis 72 (FIG. 2) to permit tracking of the sun. While a control wire 140 has been shown only in conjunction with row 14 for purposes of drawing simplification, it should be understood that a substantially identical control wire is associated with each of the rows of heliostats utilized and that each of the control wires of the individual rows will be actuated by a control unit responsive to movement of the sun to cause the mirrors of each row of heliostats to follow the sun's path.

Because of the complexity of the wire frameworks and the difficulty of portraying them in a two dimensional drawing, only a single row 14 of heliostats has been shown in FIG. 1. It should be understood, however, that the invention may utilize a plurality of rows of such heliostats and that each row would be constructed as described for the row 14. In FIG. 1, additional rows would be associated with end posts 16' and 16" and extend substantially parallel to row 14. When constructing a large array of mirrors in accord with the invention, spacing wires 46 and 48 extend transversely from each post in row 14 to a post in each of the additional rows, each pair of wires 46 and 48 running in a generally straight line path to posts along the straight line path. Generally this straight line path is perpendicular to row 14. Spacing wires 46 and 48, which extend beyond the final row of an array will, of course, be anchored to the earth or an appropriate stationary object.

In operation, the tensioned wire framework comprising the first and second primary support wires 88 and 94 and the first and second secondary support wires 114 and 116 retain all of the mirrors 66, 66', 66", etc. of row 14 and other rows in a predetermined orientation permitting solar radiation to be reflected to a target. The light-weight nature of the flexible wire framework permits substantial economy in manufacture of the heliostats and excellent weather resistance including a low wind profile.

When necessary to swing the mirrors about the axis 110 during solar tracking, the first control wire 130 is moved in direction 134 or 136 by the control transducer 132, causing the arm 108 to swing about axis 110. Since the secondary support wires 114 and 116 are stretched tautly from the upper end of arm 108 to the pins 90 of first and second pivot units 68 and 70, the mirror 66 swings about axis 110 in response to movement of the arm. Similarly, the secondary support wires 114 and 116 which extend across vertical spacer 120 to the adjacent mirror 66' compel the mirror 66' to simultaneously swing about the axis 110 and closely follow the movement of mirror 66. During such swinging of mirror 66', the upright spacer 120 pivots about its base turning in one of the directions 124 as shown in FIG. 8. In like fashion, all of the mirrors of row 14 swing about axis 110 as the arm 108 is moved by control wire 130, thereby permitting the entire row to closely follow the path of the sun and reflect solar radiation to the predetermined target.

When it is desired to swing the mirrors 66 about the axis 72 passing through each of the mirrors, the control wire 140 is moved by control transducer 148, pulling the wire in direction 142 or releasing it in direction 146 so that the take-up reel 150 or counterweight can move the wire 140 in direction 146. As the wire 140 moves in either of the directions, the wire swings the upright bails 76 in the direction of travel of the wire, causing the individual mirrors of the row 14 to swing about their axes 72 as a group, thereby tracking the sun and reflecting the radiation to the predetermined target. Accordingly, the invention may utilize a plurality of control transducers 148 to actuate additional rows of the heliostat array and all such transducers would be responsive to movement of the sun to move the mirrors of each row about their axes 72 as needed to track the sun.

While the preferred embodiments of the present invention have been described, it should be understood that various changes, adaptions and modifications may be made therein without departing from the spirit of the invention and the scope of the appended claims.

What is claimed is:

1. A lightweight heliostat system usable on a mounting surface to receive radiant energy and reflect the radiant energy to a target comprising:
   a rigid stabilizing network attachable to and extending upwardly from the mounting surface;
   a tensioning wire framework formed of flexible wire and carried by said rigid stabilizing network;
   a rigid mirror connected to and retained by said tensioning wire framework to receive the radiant energy and reflect radiant energy to the target; and
   said mirror being planar and defining a compressive strut within said tensioned wire framework.

2. A lightweight heliostat system usable on a mounting surface to receive radiant energy and reflect the radiant energy to a target comprising:
   a plurality of spaced apart, stationary, stabilizing members supported by the mounting surface and attachable to and extending upwardly from the mounting surface;
   a plurality of tensioned wire frameworks formed of flexible wire and carried by said plurality of stabilizing members;
   a plurality of rigid mirrors retained by said tensioned wire frameworks to receive the radiant energy and reflect the radiant energy to the target; and
   each said mirror being planar and defining a compressive strut within said tensioned wire frameworks.

3. A lightweight heliostat system usable on a mounting surface to receive radiant energy and reflect the radiant energy to a target comprising:
   a rigid stabilizing network attachable to and extending upwardly from the mounting surface;
   a tensioned wire framework formed of flexible wire and carried by said rigid stabilizing network;
   a rigid mirror connected to and retained by said tensioned wire framework to receive the radiant energy and reflect radiant energy to the target;
   said stabilizing network including first and second spaced apart stationary, stabilizing members;
   said rigid mirror being positioned between said first and second members and said mirror including first and second spaced apart pivots;
   said wire framework including a first primary support wire extending between said first and second members and engaging said first pivot, and further including a second primary support wire extending between said first and second members and engaging said second pivot to permit swinging of said mirror about a first axis passing through said pivots; and
   said mirror being planar and defining a compressive strut extending between said first and second primary support wires to aid in tensioning of said wire framework.

4. The lightweight heliostat system of claim 3 wherein said first and second primary support wires extend from a first junction adjacent said first member to a second junction adjacent said second member, permitting said framework and mirror to pivot about a second axis passing through said first and second junctions.

5. The lightweight heliostat system of claim 4 and further including first control means operatively attached to said arm to swing said arm to track the sun with said mirror.

6. The lightweight heliostat system of claim 4 and further including:
   an arm swingably mounted to one of said stabilizing members; and
   wherein said framework includes a wire linkage extending between said arm and said mirror to rotate said mirror about said second axis in response to swinging of said arm.

7. The lightweight heliostat system of claim 6 wherein said members are upright rigid posts.

8. The lightweight heliostat system of claim 6 wherein said mirror includes a wire ball extending outwardly from the plane of said mirror, said bail being connected to a second control wire extending parallel to said second axis to pivot said mirror about said first axis during tracking of the sun.

9. The lightweight heliostat system of claim 7 wherein each of said posts has upper and lower ends and wherein said stabilizing network further includes upper and lower spacing wires fixed to said upper and lower ends, respectively, of said posts and oriented transversely to said second axis.

10. The lightweight heliostat system of claim 3 wherein said mirror has an outer periphery and said first and second primary support wires cooperate to closely encompass said periphery to protect said periphery from mechanical damage.

* * * * *